United States Patent [19]
Regan

[11] 3,970,957
[45] July 20, 1976

[54] FLOWING GAS LASER GAS REGENERATION SYSTEM

[75] Inventor: Albert John Regan, Hoddesdon, England

[73] Assignee: BOC Limited, London, England

[22] Filed: Oct. 21, 1974

[21] Appl. No.: 516,495

[30] Foreign Application Priority Data
Oct. 23, 1973 United Kingdom............... 49318/73

[52] U.S. Cl. ..................... 331/94.5 G; 331/94.5 T; 330/4.3; 313/174
[51] Int. Cl.² .......................................... H01S 3/22
[58] Field of Search..................... 331/94.5; 330/4.3; 313/174

[56] References Cited
UNITED STATES PATENTS
3,720,885  3/1973  Koloc............................. 331/94.5 G FOREIGN PATENTS OR APPLICATIONS
1,256,398  12/1971  United Kingdom............ 331/94.5 G OTHER PUBLICATIONS
Smith, Physics Letters, vol. 27A, No. 7, Aug. 26, 1968, pp. 432–433.
Ayen et al., Atmospheric Environment, Pergammon Press, 1967, vol. 1, pp. 307–318.

Primary Examiner—Robert J. Webster
Attorney, Agent, or Firm—Dennison, Dennison, Meserole & Pollack

[57] ABSTRACT

A gas laser including a discharge tube containing a gas mixture, the discharge tube having one or more inlets and an outlet, in which a reaction vessel is in communication with said outlet and with the inlet of a vacuum pump, and in which the outlet of the vacuum pump is in communication with the or each inlet of the discharge tube.

15 Claims, 1 Drawing Figure

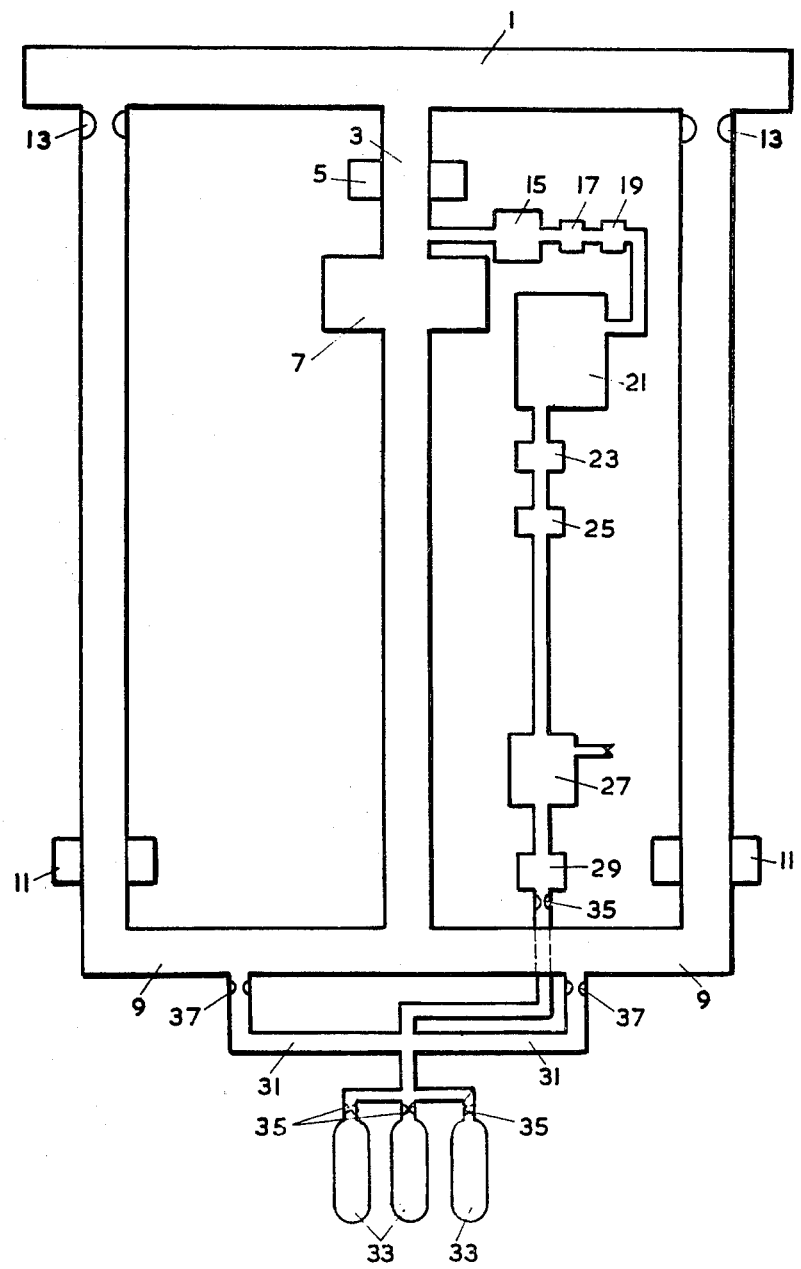

FLOWING GAS LASER GAS REGENERATION SYSTEM

This invention relates to lasers, and in particular to high power carbon dioxide lasers.

The discharge tube of a carbon dioxide laser contains a mixture of helium, carbon dioxide and nitrogen. If the amount of either carbon dioxide or nitrogen in the tube becomes too low, the laser action will very quickly cease.

In the plasma formed in the laser tube, electrons will sometimes collide with the carbon dioxide molecules and cause them to dissociate into carbon monoxide and atomic oxygen both of which hinder the mechanism leading to laser action and cause a drop in laser power. The atomic oxygen is highly reactive and will quickly react with any impurities, with parts of the apparatus, such as the electrodes, or with the nitrogen to give various oxides of nitrogen, such as nitrous oxide and nitric oxide. This will result in a decrease in the amount of carbon dioxide and nitrogen in the mixture and, if nothing is done to replace them, laser action will soon stop.

One method of solving this problem is to vent the exhaust gas to the atmosphere and replace it with a fresh mixture of helium, nitrogen and carbon dioxide. However, this wastes a lot of expensive helium.

It is an aim of the present invention to provide a laser system in which only some of the exhaust gas is vented to the atmosphere, the remainder being recirculated after having had at least some of the impurities removed.

It has been found that if the rate of flow of gas through the laser tube is sufficiently high, the percentage of carbon dioxide which dissociates before leaving the tube is so low that the build up in dissociation products is prevented even if only a small fraction of the circulating gas is passed through a reaction vessel.

The term "reaction vessel" is used in this specification to describe any vessel provided with means for reversing the dissociation processes occurring in the laser discharge tube, so that if the exhaust gases from the laser are passed through a reaction vessel, the gas mixture leaving the vessel contains less dissociation products than the gas mixture entering the vessel.

The invention will now be described, by way of example, with the aid of the accompanying drawing which shows in schematic form a gas laser of the present invention.

Gas is drawn out of laser discharge tube 1 through outlet passage 3 where it is cooled by a cooler 5. Most of the gas is drawn through Rootes blower 7, flows along passages 9 and through coolers 11 and is recirculated to the laser tube 1. The pressure at which it reenters the tube is controlled by valves or calibrated orifices 13. A small amount of the gas is drawn from outlet passage 3 through a reaction vessel 15, a cooler 17 and a filter 19 by a vacuum pump 21. The pressure of the gas passing through the reaction vessel 15 is the same as the pressure of the gas in the laser tube. Any oil or oil vapour contamination produced by the pump is removed by passing the gas through an oil trap 23 and an oil vapour trap 25. The gas then flows into a reservoir 27 from which a small amount of the gas is allowed to vent to atmosphere. The gas then passes through a vessel 29 containing alumina balls, and into passages 31. Make up gas from cylinders 33 also flows into passages 31. The amount of gas from the reaction vessel 15 and the amount of make up gas from cylinders 33 which flows through passages 31 is controlled by valves or calibrated orifices 35. The gas mixture in passages 31 is allowed to bleed into passages 9 through valves or calibrated orifices 37.

In reaction vessel 15, the recombination of carbon monoxide and the oxygen and the removal of the oxides of nitrogen must be encouraged if the laser is to operate for long periods. In practice a single catalyst or reaction stage will not fulfil both the functions, so a mixed catalyst bed or a catalyst followed by a heated tube is necessary. A typical reaction vessel contains a ruthenium catalyst at a temperature of about 300°C, followed by a tube heated to about 700°C or an iron oxide/chromium oxide catalyst at 500°C.

Experiments have been done using apparatus of the type shown in the diagram, with the pressure of the gas in the discharge tube being in the range 30–40 tor, instead of about 10–12 tor which is the pressure usually used in the discharge tubes of known lasers. When about 2,200 cu ft of gas was passing through the tube per minute, the flow was supersonic and it was found that only about 10% of the carbon dioxide dissociated during the passage through the tube, whereas, in known lasers up to 80% of the carbon dioxide may dissociate. It was discovered that under the conditions described above, even if only about 0.7% of the circulating gas was passed through the reaction vessel, an undesirable build up in the amount of dissociation products was prevented.

A laser of the present invention has the advantage over laser systems in which all the circulating gas passes through a reaction vessel that, even though the quantity of gas used is large, the amount of catalyst needed is relatively small.

I claim:

1. In a recirculating path electric discharge type gas laser having at least a main recirculation path in which the active laser gas is dissociated into chemical constituents by said discharge and in which the exhausted laser gases are passed through a chemical reactor means for treatment by a catalyst for recombining the constituents into the active laser gas, the improvement comprising means for flowing the gas laser medium fast enough to minimize active laser gas dissociation and means for diverting a very minor portion of the laser gases exhausted from the discharge region from said main recirculation path and for passing only that very minor portion of gases through said chemical reactor means for catalytically recombining only those constituents in the very minor portion of exhaust gases, for conserving the amount of catalyst used in said reaction vessel.

2. A gas laser as claimed in claim 1 in which the means for diverting a very minor portion of the laser gases exhausted comprises a positive displacement pump.

3. A gas laser as claimed in claim 1 in which a cooler is located at the outlet of the discharge region upstream of the means for directing a very minor portion of the laser gases exhausted.

4. A gas laser as claimed in claim 1 in which at least a valve or calibrated orifice is provided to control the pressure of gas entering the discharge region.

5. A gas laser as claimed in claim 4, in which a cooler is located upstream of the valve or calibrated orifice.

6. A gas laser as claimed in claim 1 in which an oil trap and oil vapor trap are connected in series downstream of the means for diverting a very minor portion of the laser gases exhausted.

7. A gas laser as claimed in claim 1 in which a reservoir is in communication with an outlet of the chemical reactor means, which reservoir has two outlets, the first outlet being in communication with the main recirculation path downstream of the means for diverting a very minor portion of the laser gases exhausted, and the second outlet being connected to atmosphere.

8. A gas laser as claimed in claim 7, in which a vessel containing alumina balls is connected to the first outlet of the reservoir.

9. A gas laser as claimed in claim 7, in which the first outlet of the reservoir is in communication with one end of a passage of which the other end is connected to the main recirculation path downstream of the means for diverting a very minor portion of the laser gases exhausted.

10. A gas laser as claimed in claim 9, in which a valve or calibrated orifice is located at the said one end of the passage to control the pressure at which gas enters the passage.

11. A gas laser as claimed in claim 9, in which gas cylinders containing nitrogen, helium and carbon dioxide are in communication with the said passage, and in which valves or calibrated orifices are located between the cylinders and the passage to control the pressure at which gas enters the passage from the cylinders.

12. A gas laser as claimed in claim 9, in which valves or calibrated orifices are located at the said other end of the passage to control the rate at which gas enters the main recirculation path.

13. A gas laser as claimed in claim 1, in which the chemical reactor means contains a ruthenium catalyst maintained at 300°C.

14. A gas laser as claimed in claim 1, in which the reactor means contains a tube heated to 700°C.

15. A gas laser as claimed in claim 1, in which the reactor means contains an iron oxide/chromium oxide catalyst at 500°C.

* * * * *